Figure 1:
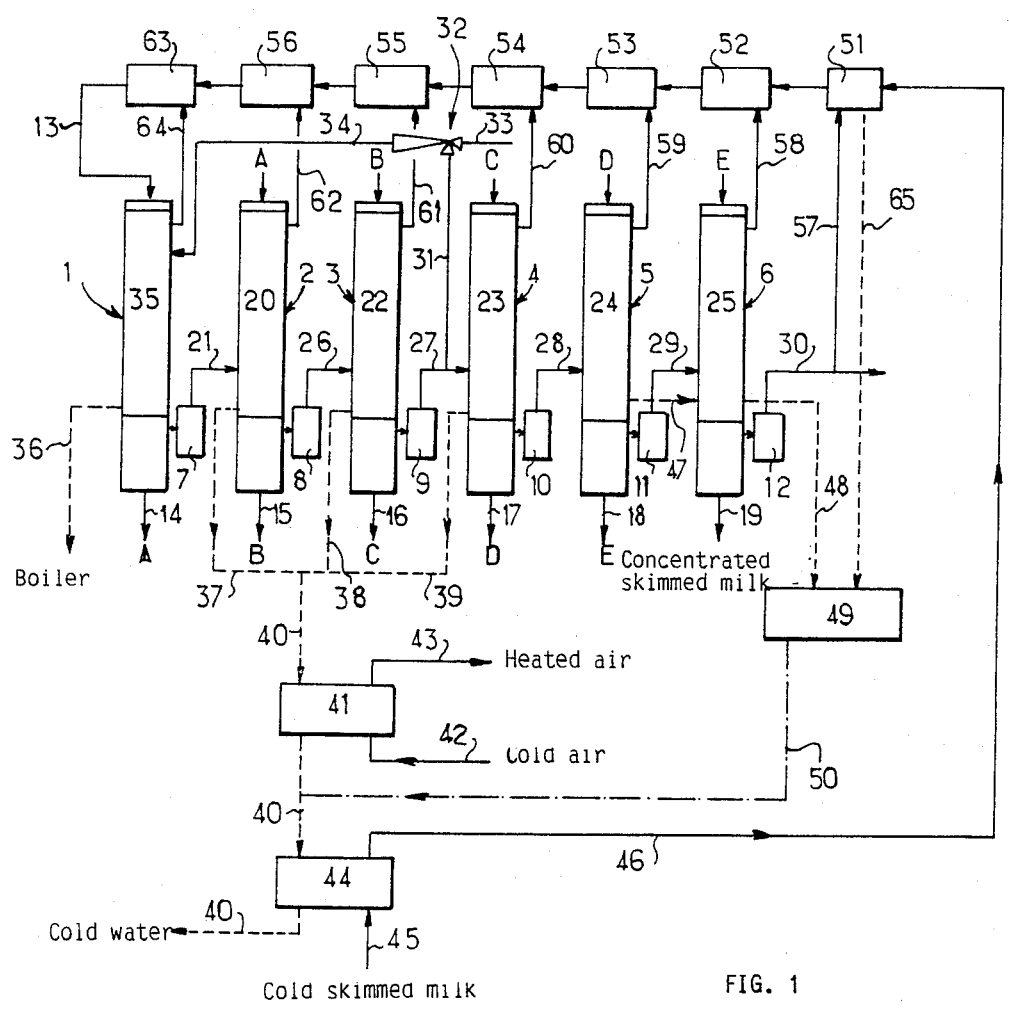

United States Patent [19]

Ciboit

[11] Patent Number: 4,495,212
[45] Date of Patent: Jan. 22, 1985

[54] PROCESS FOR CONCENTRATING A COLD PRODUCT AND FOR PREHEATING A CIRCULATING FLUID

[75] Inventor: Jacques J. Ciboit, Paris, France

[73] Assignee: Laguilharre S.A., Rueil Malmaison, France

[21] Appl. No.: 267,893

[22] Filed: May 28, 1981

[51] Int. Cl.³ ........................ A23C 1/00; B01D 1/18
[52] U.S. Cl. .................................. 426/492; 159/24 B
[58] Field of Search ............. 426/492, 491, 521, 471, 426/476; 159/24 A, 24 B, 17 R, DIG. 8

[56] References Cited

U.S. PATENT DOCUMENTS

| | | | |
|---|---|---|---|
| 3,065,076 | 11/1962 | Wenner et al. | 426/471 |
| 3,947,327 | 3/1976 | Greenfield et al. | 203/10 |
| 4,239,588 | 12/1980 | Engelhardt | 159/24 B |
| 4,265,701 | 5/1981 | Lankenau | 203/7 |
| 4,303,468 | 12/1981 | Laguilharre et al. | 159/24 A |

*Primary Examiner*—George Yeung
*Attorney, Agent, or Firm*—Warren B. Kice

[57] ABSTRACT

A process for concentrating a cold liquid dairy product and for preheating a circulating fluid, which comprises the steps of submitting the liquid dairy product to a multi-stage evaporation by supplying a first evaporation stage with heating vapor as a source of heat for evaporation of the liquid dairy product in the first evaporation stage to convert the heating vapor to condensate and produce evaporation vapor from the liquid dairy product; supplying the second evaporation stage with evaporation vapor produced in the first evaporation stage so that the first evaporation stage supplies a source of heat for evaporation of the liquid dairy product in the second evaporation stage to convert the evaporation vapor supply in the second evaporation stage to condensate and produce evaporation vapor from the liquid dairy product; repeating the steps of submitting and supplying up to and including the last evaporation stage; preheating the circulating fluid by a one-step heat exchange with the evaporation vapor, the condensates or the mixture thereof, withdrawn from at least one evaporation stage; and preheating the cold liquid dairy product to be concentrated by heat exchange with at least a portion of the condensates resulting from the vapor, the condensates or the mixture thereof after their heat exchange with the circulating fluid.

4 Claims, 5 Drawing Figures

1

PROCESS FOR CONCENTRATING A COLD PRODUCT AND FOR PREHEATING A CIRCULATING FLUID

The present invention relates to a process for concentrating a cold product, such as a cold diary product, and for preheating a circulating fluid, which consists in subjecting said cold product to successive evaporations, the vapour produced during each evaporation being used to create the following evaporation, and in using the vapour and/or condensates produced during at least one of the successive evaporations for preheating said fluid in one step. It also relates to an installation for implementing this process.

For preheating a cold fluid it is in fact especially advantageous to use heat, in the form of vapour and/or condensates, taken at any level in this evaporation, since this heat which has already served for evaporating is economic. Because of this removal of heat it is necessary, in order to maintain the same final concentration of the product, to use more vapour in the first evaporation step, but it remains nevertheless true that the amount of heat available after the last evaporation may be insufficient for preheating the cold product to be concentrated, which generally has a disastrous effect on the evaporation operations. In this case, recourse is had, for achieving this preheating, to external uneconomic vapour, which obviously increases considerably the operating cost in the installation implementing the process of the above type.

The present invention proposes eliminating these drawbacks and for this it provides a process which is characterized in that all or part of the condensates obtained after use of the vapour and/or condesates for preheating the fluid, possibly mixed with all or part of the condensates coming from the successive evaporations and with all or part of the condensed steam coming from the last evaporation, are used for reheating the cold product to be subjected to the successive evaporations.

In operating in this manner, heat is transferred to the cold product which is particularly economic since it has already served for evaporating, and the substantial economy which it is possible to achieve under these circumstances will be readily understood.

All or part of the vapour required for creating the first evaporation may be produced by thermocompression of all or part of the vapour created during any one of the successive evaporations.

A part of the vapour required for creating the first evaporation may moreover be obtained by mechanical recompression of all or part of the vapour created by any one of the evaporations. In this case, the present invention is particularly interesting since, because of this mechanical recompression, the amount of vapour and so of heat available after the last evaporation is even smaller.

In a variation, the product to be concentrated is subjected to pasturization before evaporation and therefore it is advantageous to use the thus pasturized product for heating the condensates intended to preheat said fluid in one step.

According to another characteristic of the invention, the vapour and/or the condensates for preheating said fluid in one step are previously reheated by means of vapour produced by thermocompression of all or part of the vapour created during any one of the successive evaporations.

It should be noted that the fluid to be preheated may be air intended to be used in a drier in which the concentrated product is treated after undergoing the successive evaporations or any other available concentrate, the drier being for example of the spray type.

The installation used for implementing the process such as defined above is characterized more especially in that it comprises a multistage evaporator receiving the product to be concentrated, whose heating shell in at least one stage is provided with a conduit for removing condensates and/or vapour, this conduit or these conduits previously brought together into a single conduit extending through a first indirect heat exchanger comprising a circuit for the cold fluid to be preheated then through a second indirect heat exchanger comprising a circuit for the cold product to be treated in the evaporator, which is thus reheated.

It should be noted that the heating shell of the last stage is provided at its base with a condensate-removal conduit connected directly or through a storage tank and upstream of the second exchanger, at one or more points of at least one of the conduits conveying condensates and/or vapour taken from the evaporator. These condensates may thus either contribute to reheating the incoming cold product or be used as a hot-water source.

In a variation, the condensate and/or vapour removal conduit or the condensate and/or vapour conduits brought together into a single conduit extend through an indirect heat exchanger comprising a circuit for the cold fluid to be preheated, before returning to emerge into the heating shell of one stage of the evaporator, the heating shell of the last stage being provided at its base with a condensate removal conduit connected directly or through a storage tank to an indirect heat exchanger comprising a circuit for the cold product to be treated in the evaporator and which is thus reheated.

Finally, these installations may comprise a conduit for conveying condensed steam from the last stage, this conduit being connected to the condensate removal conduit or to the storage tank.

Figure 2:
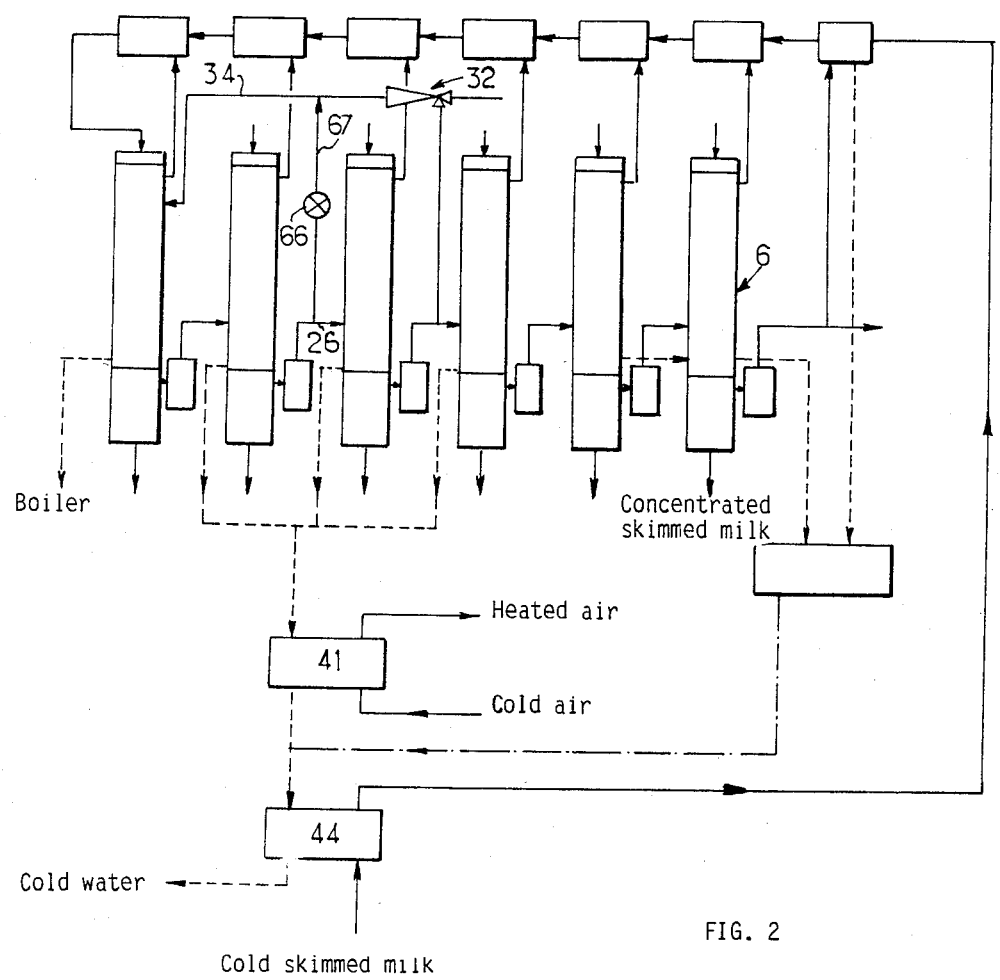
Figure 3:
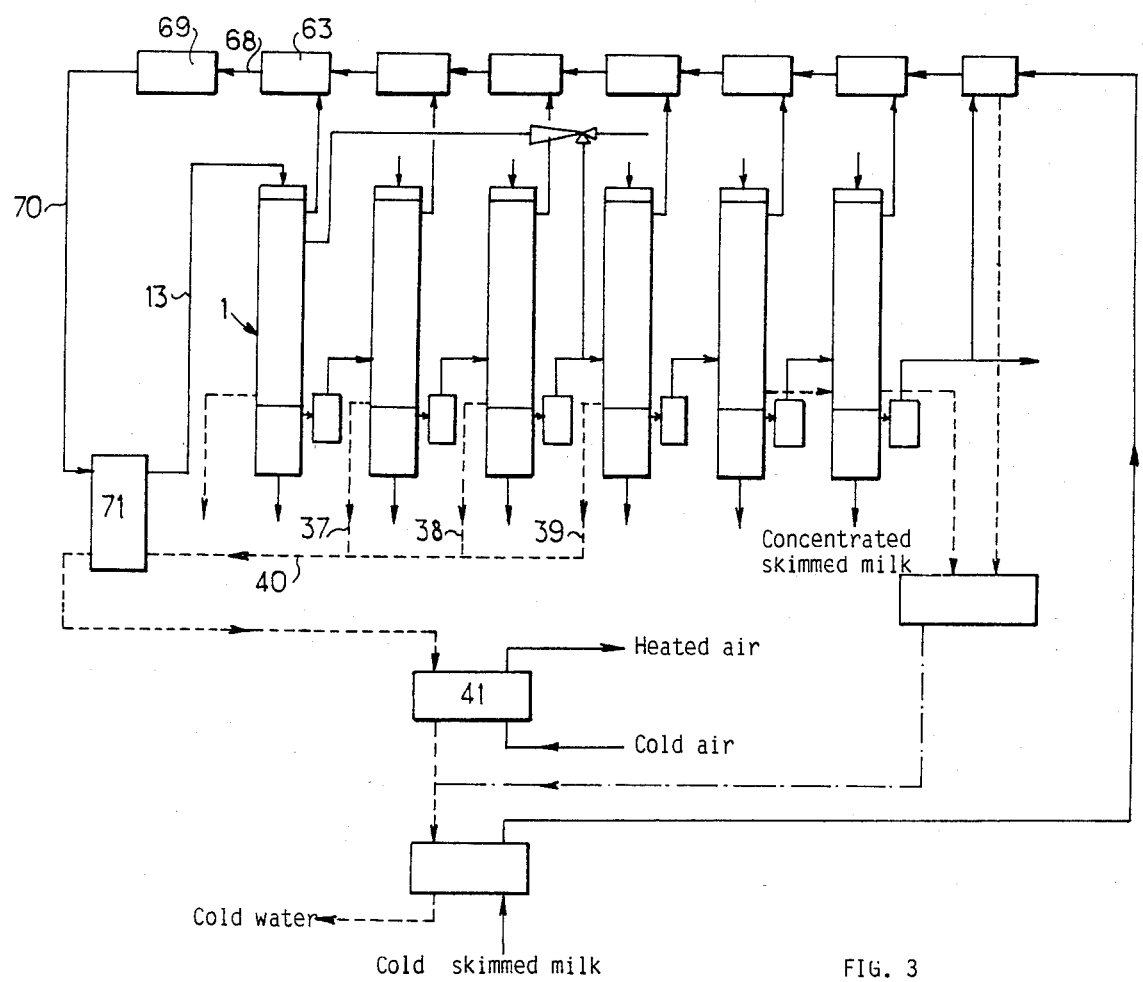
Figure 4:
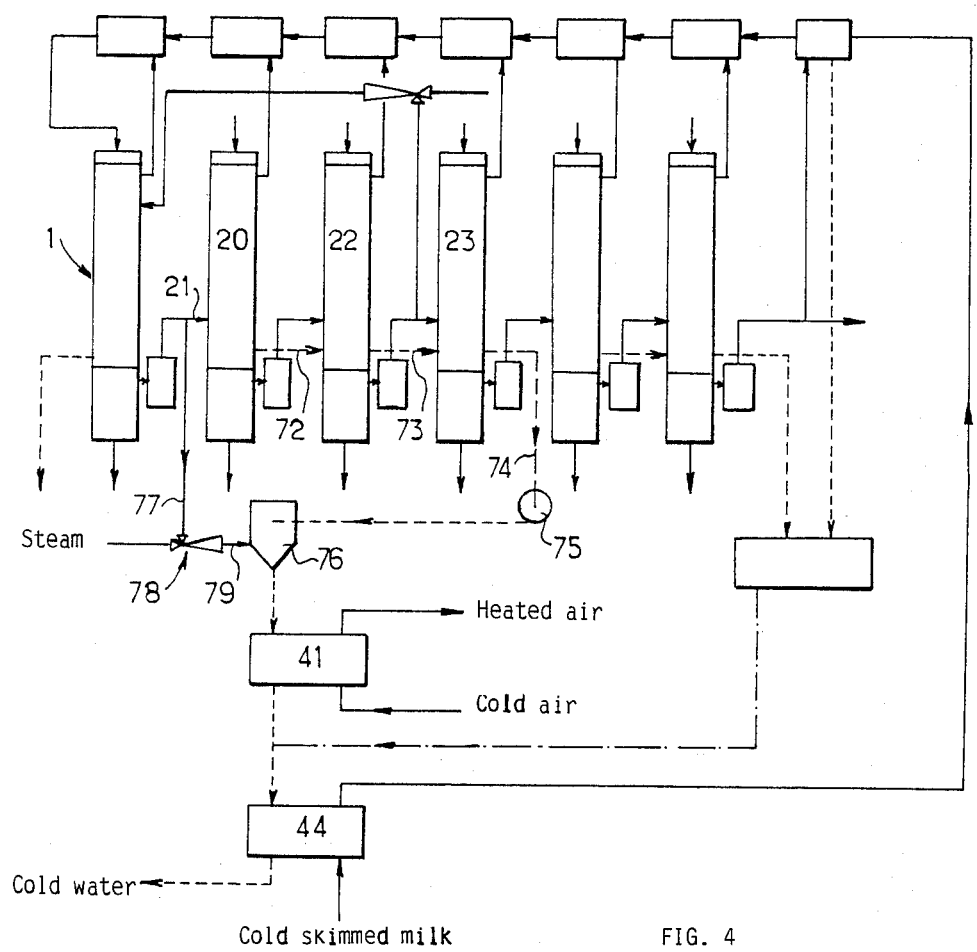
Figure 5:
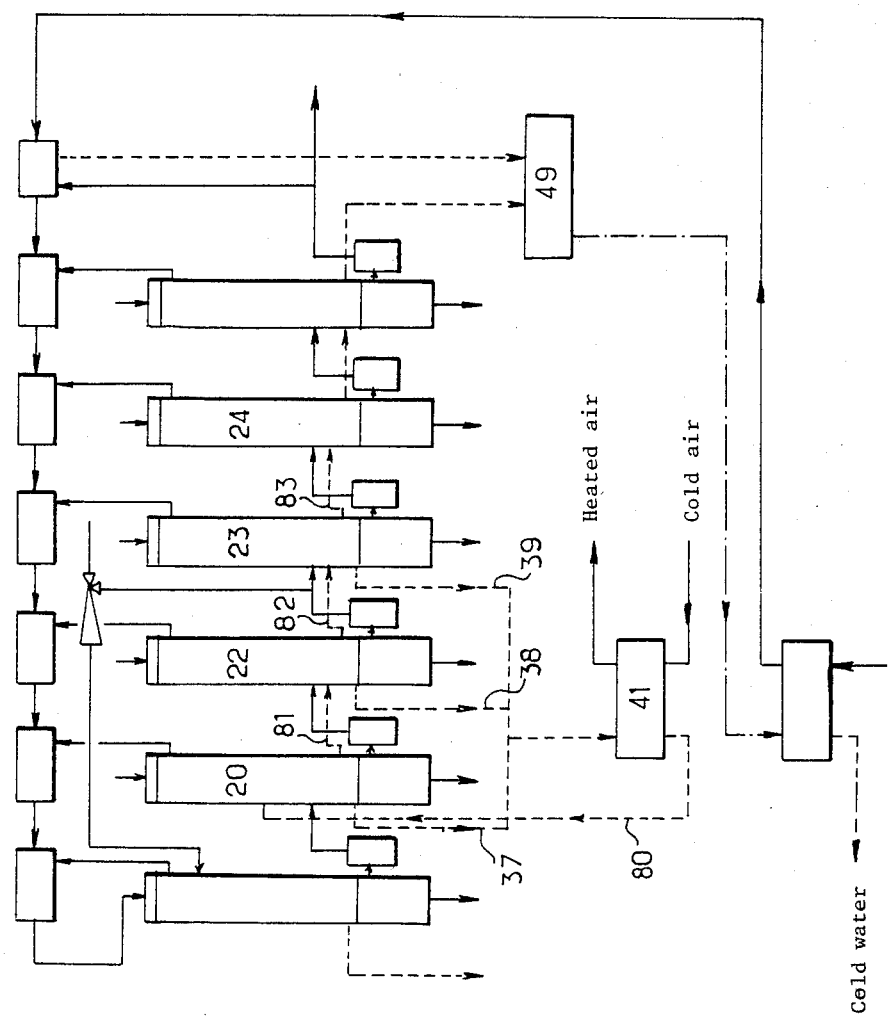

Several embodiments of the present invention are shown by way of examples in the accompanying drawings in which the different figures show schematically an installation in accordance with the invention:

the installation of FIG. 1 comprising a six-stage evaporator, condensates being removed from the 2nd, 3rd and 4th stages, the installation of FIG. 2 being that of FIG. 1, but comprising a vapour thermocompressor associated with a mechanical vapour recompressor, the installation of FIG. 3 being that of FIG. 1, but comprising a pasturizer, the installation of FIG. 4 comprising a six-stage evaporator and condensates being removed from the 4th stage, these condensates being preheated before use for reheating a circulating fluid, and the installation of FIG. 5 being that of FIG. 1, but the condensates being fed into the 2nd stage after serving for preheating a fluid.

The installation of FIG. 1 comprises an evaporator having six stages 1 to 6 maintained at pressures increasing from the first to the last and with which there are respectively associated vapour-liquid separators 7 to 12. The product to be concentrated which is skimmed milk is introduced by conduit 13 at the top of the first stage 1, then brought from the base of this stage to the head A of the second stage 2 by a conduit 14, and from stage to stage in the same way respectively by conduits 15 to 18. At the base of the last stage 6 the concentrated skimmed milk is extracted through a conduit 19. The vapour created by evaporation of the skimmed milk in stage 1 is fed, after passing through the vapour-liquid separator 7, into the heating shell 20 of stage 2 through a conduit 21 and so on, the vapour created in stages 2, 3, 4 and 5 being fed, after passing through the vapour-liquid separators 8, 9, 10, and 11, respectively into the heating shells 22, 23, 24 and 25 through conduits 26, 27, 28 and 29. The vapour created in stage 6 is directed, after passing through separator 12, to a vacuum source (not shown) through a conduit 30.

Conduit 27 carries as a branch line the suction conduit 31 of a vapour thermocompressor 32 supplied with live steam through a conduit 33, and a part of the vapour flowing in said conduit 27 is thus removed to be delivered through the delivery conduit 34 of said thermocompressor, to the heating shell 35 of stage 1.

Of course, the evaporator could comprise more or less than 6 stages and the thermocompressor could remove the evaporation vapour coming from any one of the stages, without that modifying in any way the present invention.

The condensates which are formed in the heating shell 35 are drawn off through a conduit 36 and directed wholly or partly to a boiler (not shown) where the vapour required for operating the thermocompressor 32 is produced.

The condensates produced in the heating shells 20, 22 and 23 are removed respectively through conduits 37, 38 and 39 which are connected so as to form a single conduit 40 which passes first of all through a first indirect heat exchanger 41 where they heat the cold air entering this latter through a pipe 42 and leaving therefrom through a pipe 43, then a second indirect heat exchanger 44 where they heat the cold skimmed milk to be treated in the evaporator, this cold milk entering exchanger 44 through a pipe 45 and leaving therefrom through a pipe 46.

Moreover, the condensates from the heating shell 24 are directed to the heating shell 25 through a conduit 47 and the condensates from heating shell 25 are drawn off through a conduit 48 and fed to a storage tank 49. The condensates thus collected in this tank may then either serve as hot water whose uses are multiple, or be mixed wholly or partly with the condensates coming from exchanger 41, by using a conduit 50 connected to conduit 40 at the portion thereof existing between the two exchangers 41 and 44.

Condensates or vapour could of course have been removed from more or less than three stages and from one or more stages other than stages 2, 3 and 4 without that modifying in any way the principle of the invention.

Pipe 46 passes then through a battery of indirect heat exchangers 51 to 56 fed respectively with vapour created in stages 6 to 1, through pipes 58 to 62. The skimmed milk coming from exchanger 56 passes finally through an indirect heat exchanger 63 supplied through a conduit 64 with vapour coming from heating shell 35, before being directed through pipe 13 to the head of stage 1, where it arrives sufficiently heated for the evaporation to take place without difficulty. The condensates created in exchanger 51 are, insofar as they are concerned, fed through a pipe 65 into tank 49 where they are mixed with the condensates coming from the last stage and may then contribute to heating the skimmed milk in exchanger 44.

It should be noted that the temperature of the condensates coming from exchanger 44 and which give up their heat to the skimmed milk generally reaches a value sufficiently low for them to be subsequently used as cold source, insofar as the skimmed milk fed into this exchanger 44 is itself at a low temperature.

The installation of FIG. 2 is in all respects identical to that of FIG. 1, except that conduit 26 carries as a branch line the suction conduit of a mechanical vapour recompressor 66 whose delivery conduit 67 is connected to the delivery conduit 34 of the thermocompressor 32. Because of the presence of this recompressor, less vapour requires to be injected at the level of the thermocompressor 32, which results in the amount of vapour available at the output of stage 6 being smaller than in the installation of FIG. 1. The use of the heat from the condensates coming from exchanger 41 for preheating the cold skimmed milk in exchanger 44 is then particularly advantageous.

The installation of FIG. 3 differs from the installation of FIG. 1:
  in that the preheated skimmed milk coming from exchanger 63 is fed through a conduit 68 into a pasturizer 69 then is fed by conduit 70 into an exchanger 71 before being directed through conduit 13 to the heat of stage 1, and
  in that the condensates from conduits 37, 38 and 39 and brought together into conduit 40 are previously heated in said exchanger 71 before being introduced into exchanger 41.

It is thus possible to advantageously recover heat used for pasturization, heat which serves for heating the air to a higher temperature and for preheating the cold skimmed milk.

The installation of FIG. 4 differs from that of FIG. 1 by the following modifications. The condensates from heating shell 20 are fed into heating shell 22 by a pipe 72, the condensates from heating shell 22 are fed into heating shell 23 by a pipe 73 and the condensates from heating shell 23 are drawn off from this latter by means of a pipe 74 and a pump 75 and directed into a reheater 76. Moreover, conduit 21 carries as a branch line the suction conduit 71 of a thermocompressor 78 whose delivery conduit 79 emerges into said reheater 76. The fraction of vapour taken from conduit 21 and subjected to thermocompression is thus used for heating the condensates arriving in the reheater 76. The reheated condensates then pass, as in FIG. 1, successively through exchanger 41 then exchanger 44.

The installation of FIG. 5 differs from that of FIG. 1 in that the condensates leaving exchanger 41 are fed through a conduit 80 into heating shell 20. The condensates present respectively in heating shells 20, 22 and 23 and not removed through conduits 37, 38 and 39 are fed respectively by conduits 81, 82 and 83 into the heating shell of the stage which follows the one from which they are taken. In this case, the cold skimmed milk will be heated by using all or part of the condensates available in tank 49.

In the installations shown in FIGS. 1 to 5, the heat taken from the evaporator serves for heating the cold air, but this cold air may be replaced by any fluid whatever which it is desired to heat. Air or the fluid thus heated has different applications, for example, when the fluid in question is air, this latter may be used after more thorough heating, in a drier, for example of the spray type, in which drier the concentrated skimmed milk coming from stage 6 or any other available concentrate may be treated.

Furthermore, it should be noted that in the installations shown in FIGS. 1 to 5 described above, pipe 50 is not necessarily connected to conduit 40 at the portion existing between the two exchangers 41 and 44 but may be connected to this portion and/or to conduit 40 upstream of exchanger 41.

Furthermore, the heat exchanger 41 may be formed by several smaller exchangers arranged in series, in which case pipe 50 may also be connected to pipe 40 at a portion, at least, existing between these different exchangers.

I claim:

1. A process for concentrating a cold liquid dairy product and for preheating a circulating fluid, which comprises the steps of:
   (a) submitting said liquid dairy product to a multi-stage evaporation by supplying a first evaporation stage with heating vapor as a source of heat for evaporation of the liquid dairy product in said first evaporation stage to convert said heating vapor to condensate and produce evaporation vapor from the liquid dairy product, supplying the second evaporation stage with evaporation vapor produced in the first evaporation stage, so that the first evaporation stage supplies a source of heat for evaporation of the liquid dairy product in said second evaporation stage to convert the evaporation vapor supply in said second evaporation stage to condensate and produce evaporation vapor from the liquid dairy product, and repeating the above steps of submitting and supplying up to and including the last evaporation stage,
   (b) withdrawing evaporation vapor, condensates or a mixture thereof, from at least one evaporation stage,
   (c) preheating said circulating fluid by a one-step heat exchange with the evaporation vapor, the condensates or the mixture thereof, withdrawn from said at least one evaporation stage, and,
   (d) preheating the cold liquid dairy product to be concentrated, by heat exchange with at least a portion of the condensates resulting from the vapor, the condensates or the mixture thereof after their heat exchange with the circulating fluid.

2. A process for concentrating a cold liquid dairy product and for preheating a circulating fluid, which comprises the steps of:
   (a) submitting said liquid dairy product to a multi-stage evaporation by supplying a first evaporation stage with heating vapor as a source of heat for evaporation of the liquid dairy product in said first evaporation stage to convert said heating vapor to condensate and produce evaporation vapor from the liquid dairy product, supplying the second evaporation stage with evaporation vapor produced in the first evaporation stage, so that the first evaporation stage supplies a source of heat for evaporation of the liquid dairy product in said second evaporation stage to convert the evaporation vapor supply in said second evaporation stage to condensate and produce evaporation vapor from the liquid dairy product, and repeating the above steps of submitting and supplying up to and including the last evaporation stage,
   (b) withdrawing evaporation vapor, condensates or a mixture thereof, from at least one evaporation stage,
   (c) preheating said circulating fluid by a one-step heat exchange with the evaporation vapor, the condensates or the mixture thereof, withdrawn from said at least one evaporation stage,
   (d) withdrawing all or part of the condensates from at least one evaporation stage,
   (e) condensing all or part of the evaporation vapor produced in the last evaporation stage,
   (f) mixing together the condensates withdrawn from said at least one evaporation stage, the condensed evaporation vapor produced in said last evaporation stage and at least a portion of the condensates resulting from the vapor, the condensates or the mixture thereof after their heat exchange with the circulating fluid, to obtain a mixture of condensates and
   (g) preheating the cold liquid dairy product to be concentrated, by heat exchange with said mixture of condensates.

3. A process for concentrating a cold liquid dairy product and for preheating a circulating fluid, which comprises the steps of:
   (a) pasteurizing the liquid dairy product to be concentrated,
   (b) submitting said liquid dairy product to a multi-stage evaporation by supplying a first evaporation stage with heating vapor as a source of heat for evaporation of the liquid dairy product in said first evaporation stage to convert said heating vapor to condensate and produce evaporation vapor from the liquid dairy product, supplying the second evaporation stage with evaporation vapor produced in the first evaporation stage, so that the first evaporation stage supplies a source of heat for evaporation of the liquid dairy product in said second evaporation stage to convert the evaporation vapor supply in said second evaporation stage to condensate and produce evaporation vapor from the liquid dairy product, and repeating the above steps of submitting and supplying up to and including the last evaporation stage,
   (c) withdrawing evaporation vapor, condensates or a mixture thereof, from at least one evaporation stage,
   (d) heating the evaporation vapor, condensates or a mixture thereof, withdrawn from said at least one evaporation stage, by heat exchange between these latter and the pasteurized liquid dairy product before submitting the pasteurized liquid product to said multi-stage evaporation,
   (e) preheating said circulating fluid by a one-step heat exchange with the evaporation vapor, the condensates or the mixture thereof introduced with the pasteurized liquid dairy product, and
   (f) preheating the cold liquid dairy product to be pasteurized and concentrated, by heat exchange with at least a portion of the condensates resulting from the vapor, the condensates or the mixture thereof after their exchange with the circulating fluid.

4. The process according to claim 3, wherein all or part of the evaporation vapor produced in anyone of the evaporation stages is submitted to a thermocompression, the condensates withdrawn from said at least one evaporation stage being heated, before their use for preheating said circulating fluid, by heat exchange between said condensates withdrawn from said at least one evaporation stage and the vapor resulting from said thermocompression.

* * * * *